United States Patent
Tsunedomi et al.

(10) Patent No.: US 6,546,485 B1
(45) Date of Patent: Apr. 8, 2003

(54) METHOD FOR EXCHANGING MODULES IN OPERATING SYSTEM BY USING INHERITANCE BUFFER PRESENTED IN VIRTUAL SPACE TO STORE INHERITED INFORMATION OF OLD MODULE AND READ BY NEW MODULE THEREAFTER

(75) Inventors: Kunihiko Tsunedomi, Hitachi (JP); Tadashi Kamiwaki, Naka-gun (JP); Masahiko Saito, Hitachi (JP); Keiji Kuwahara, Naka-gun (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/263,785

(22) Filed: Mar. 5, 1999

(30) Foreign Application Priority Data

Mar. 13, 1998 (JP) .......................... 10-062500

(51) Int. Cl.[7] .............................. G06F 9/06
(52) U.S. Cl. .................... 713/100; 713/2; 711/100
(58) Field of Search ................ 713/1, 2, 100; 712/205; 711/1, 5, 100; 710/1–5, 36, 52

(56) References Cited

U.S. PATENT DOCUMENTS

| | | | | |
|---|---|---|---|---|
| 4,799,145 A | * | 1/1989 | Goss et al. ................... 713/1 |
| 4,926,422 A | * | 5/1990 | Alaria et al. .................. 370/97 |
| 5,313,387 A | * | 5/1994 | McKeeman et al. .......... 700/90 |
| 5,604,887 A | * | 2/1997 | Naidu et al. ................... 710/1 |
| 5,784,611 A | * | 7/1998 | Thantrakul ..................... 713/1 |
| 5,805,882 A | * | 9/1998 | Cooper et al. ................. 713/2 |
| 6,122,733 A | * | 9/2000 | Christeson et al. ............ 713/2 |

FOREIGN PATENT DOCUMENTS

| | | | |
|---|---|---|---|
| JP | 02194446 A | * | 8/1990 |
| JP | 7-319683 | | 12/1995 |
| JP | 8-212064 | | 8/1996 |

* cited by examiner

*Primary Examiner*—Thomas Lee
*Assistant Examiner*—Thuan Du
(74) *Attorney, Agent, or Firm*—Kenyon & Kenyon (57) ABSTRACT

An operating system (OS) supports logical storage and comprises a framework and a plurality of modules to realize exchange of modules including a memory management module. The OS exchanges modules online and has a logical address space as well as a fixed physical space whose physical addresses and logical addresses are equal to each other, and the fixed physical space has the framework and an inheritance buffer. Information is inherited between old and new modules to be exchanged, by the inheritance buffer.

3 Claims, 10 Drawing Sheets

METHOD FOR EXCHANGING MODULES IN OPERATING SYSTEM BY USING INHERITANCE BUFFER PRESENTED IN VIRTUAL SPACE TO STORE INHERITED INFORMATION OF OLD MODULE AND READ BY NEW MODULE THEREAFTER

BACKGROUND OF THE INVENTION

The present invention relates to online exchange modules in an operating system (OS) which supports a logical space, and, more specifically, to a memory management module.

In industrial fields or embedded systems, the function of online partial exchange of an OS is important. If online exchange is possible, the down time of the system can be reduced. For example, the system need not be stopped in order to upgrade the OS or fix bugs thereof.

In addition, the memory capacity of the OS can be reduced. For example, a trace function will be considered below. Normally, an OS having no trace function is made to operate. If a trouble occurs, the OS is partially replaced with a trace function support version to trace its operation. In this manner, it is possible to minimize the memory capacity required for tracing.

A method of updating a running program by altering or adding a module to the program is described in Japanese Patent Laid-Open No. 319683/1995.

In this method, while a control section is executing an old load module, a relocatable type of new load module is stored in a main storage and an address linkage is established between the new load module and the old load module. During program updating, a call to the old load module from another module is inhibited, and the leading address of the old load module is rewritten with a jump-to-new load module instruction and the call inhibition is canceled. During a return from the program updating, the call to the old load module from another load module is inhibited, and the leading address of the old load module is rewritten with contents which were present before the program updating, and the call inhibition is canceled.

Presently, even a small OS such as an embedded system have had memory control which supports a logical space. The use of a logical space makes it possible to solve the problem of external fragmentation and increase the efficiency of use of memory. It is also possible to strengthen memory protection To this end, the memory control is realized as one module called memory management module.

Figure 2:
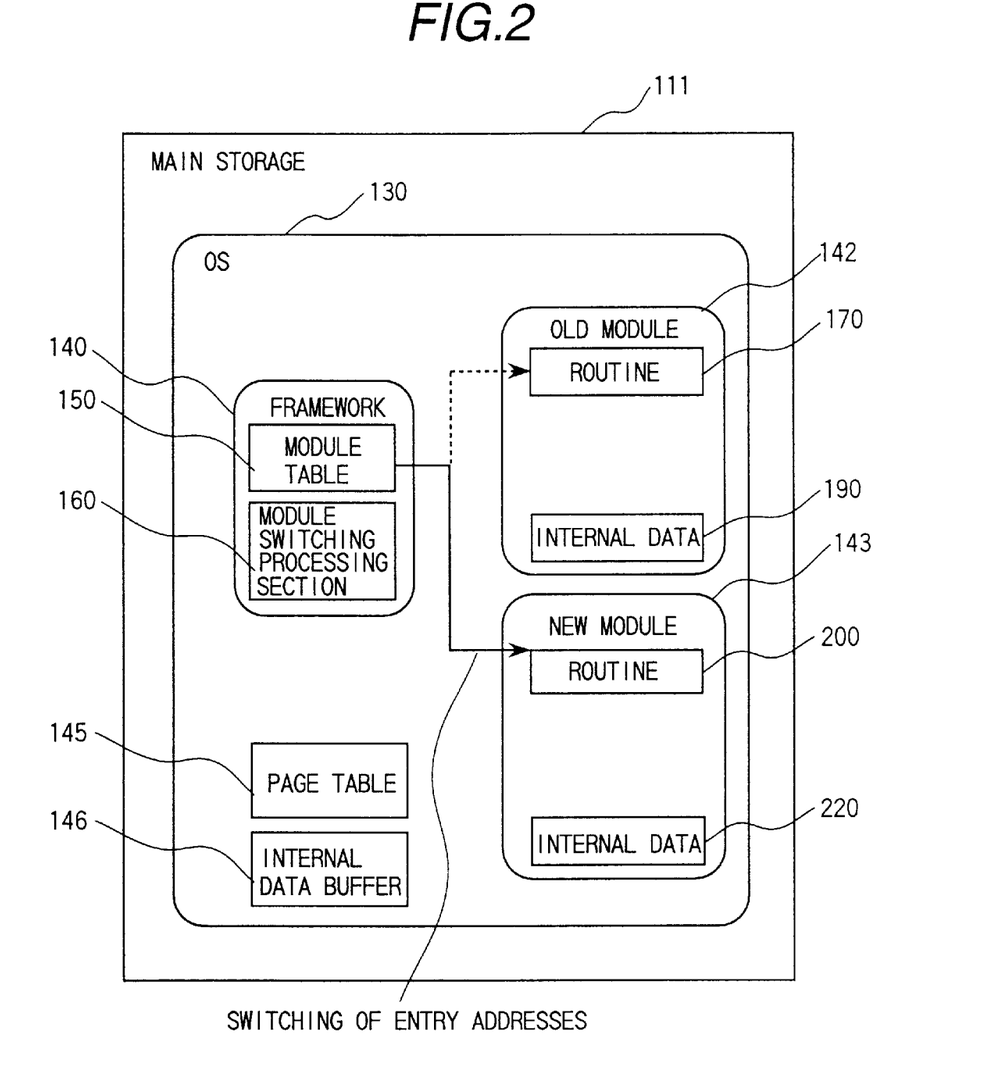
FIG. 2 is a block diagram of a conventional module exchanging method.

However, the prior art shown in FIG. 2 has the problem that even if the memory control is realized as a module, the module cannot be exchanged online. The reason for this is as follows. The memory management module has a page table to record the correspondence between logical addresses and physical addresses. However, at the moment when an old module 142 is newly switched to a new module 143, the internal data of the new module 143 is in an initialized state. A page table for the new module 143 is not yet created. Accordingly, the new module 143 is not able to refer to the internal data of the old module 142 on the logical space, and loses the whole of the current mapping information. Accordingly, the OS becomes unable to continue a normal operation.

Because of the above-described problems, the conventional OS does not support the exchange of the memory management module. However, the memory capacity of the memory management module occupies a large proportion. If the online exchange of the memory management module is realized, it is possible to effectively reduce the down time of the OS.

SUMMARY OF THE INVENTION

In view of the above-described problems, an object of the prevent invention is to provide a module exchanging method and apparatus both of which make it possible to inherit data from an old load module to a new load module and online replace the old load module with the new load module.

The above object can be achieved by a method of exchanging modules in an operating system which includes a plurality of modules, a framework, an inheritance buffer which holds logical addresses and physical addresses for each module, and an inheritance buffer and includes a fixed physical space whose logical space and physical space are equal to each other and a virtual space whose logical space and physical space do not coincide with each other, wherein the operating system has a page table which manages a correspondence between logical addresses and physical addresses for each module and a memory management table which manages the page table, and wherein the correspondence between the logical addresses and the physical addresses is stored in the inheritance buffer from the page table of an old memory management module before an exchange, and a new memory management module after the exchange reads the correspondence between the logical addresses and the physical addresses from the inheritance buffer and creates the page table of the new memory management module.

DETAILED DESCRIPTION OF THE INVENTION

Figure 3:
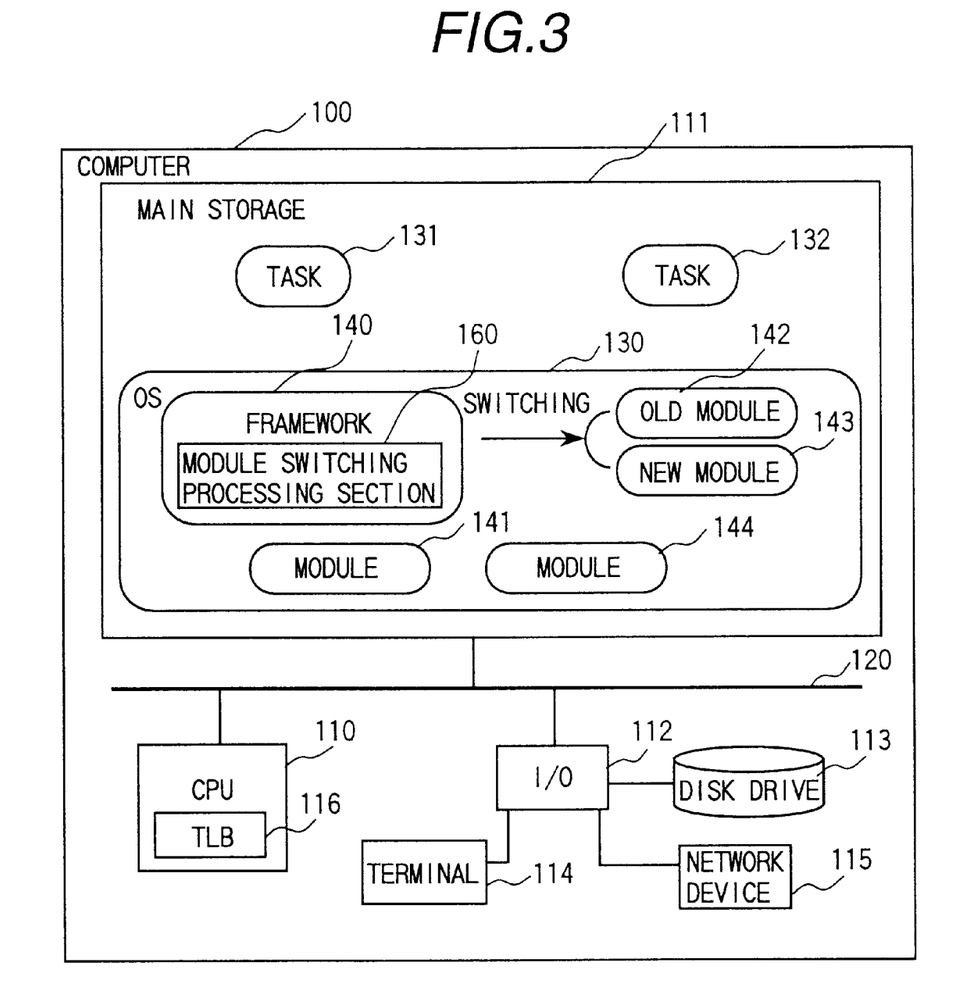
FIG. 3 is a view of a construction example on a computer according to the present invention.

FIG. 3 shows a construction example in which the present embodiment is realized on a computer.

FIG. 3 shows a system in which an OS including a framework and modules operates. A computer 100 has a central processing unit (CPU) 110, a main storage 111 and an input/output device (I/O) 112 as its internal devices, all of which are connected to one another by a bus 120. A disk drive 113, a terminal 114 and a network device 115 are connected to the input/output device (I/O) 112.

A TLB (Translation Look-aside Buffer) 116 is present in the CPU 110.

An OS 130 and a plurality of tasks 131 and 132 are present on the main storage 111, and are executed by the CPU 110. The OS 130 includes a framework 140 and a plurality of modules 141 to 144. When the old module 142 is to be exchanged for the new module 143, a module switching processing section 160 of the framework 140 performs switching processing.

Figure 1:
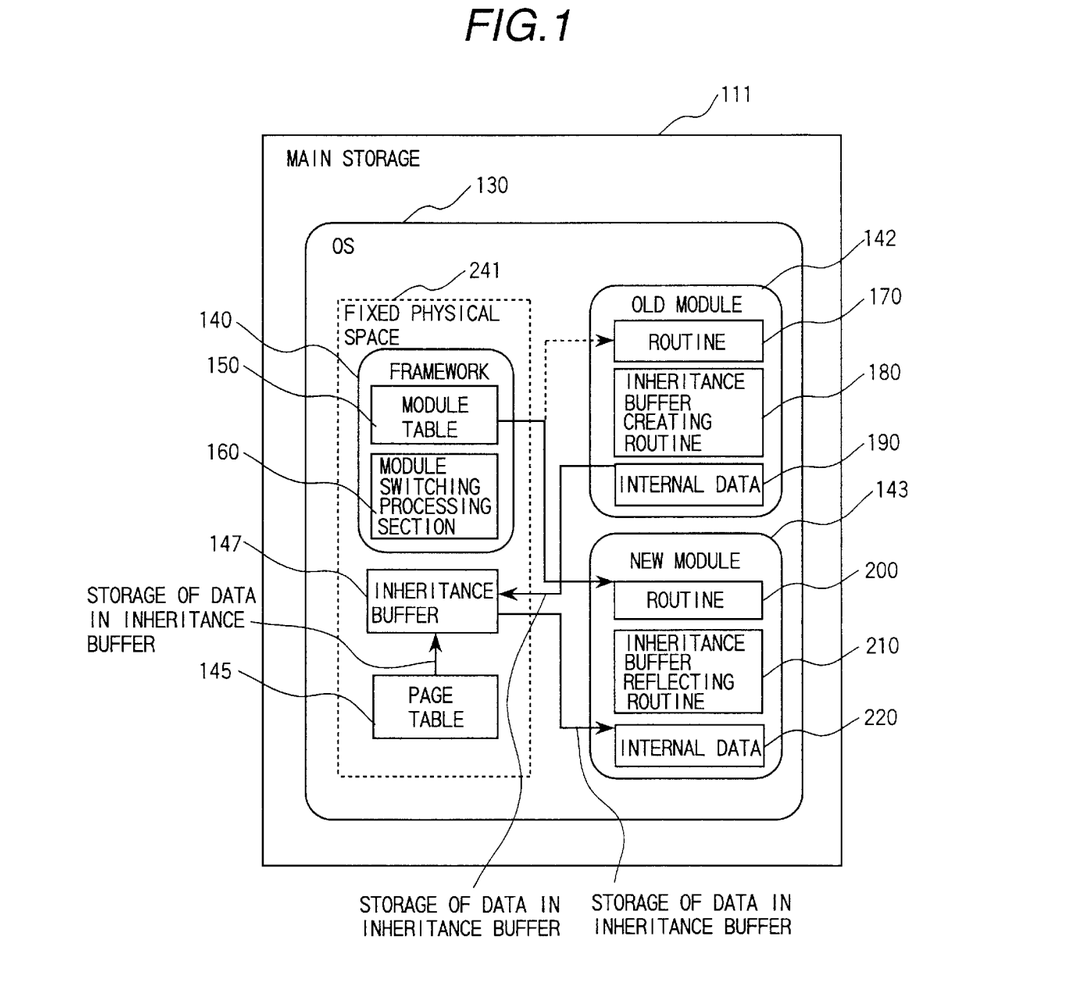
FIG. 1 is a block diagram of a module exchanging method according to the present invention.

FIG. 1 shows a detailed construction of the OS 130 on the main storage 111. The OS 130 includes the framework 140, the old module 142, the new module 143, an inheritance buffer 147 and a page table 145. The framework 140 has a module table 150 and a module switching processing section 160. The module table 150 holds entry addresses which respectively indicate entries to routines 170 and 200 of the old and new modules 142 and 142. The module table 150 will be described later in detail with reference to FIG. 5. The module switching processing section 160 is a program which performs module processing. The module switching processing section 160 reads an object of the new module 143 from the network device 115 or the disk drive 113 and replaces the old module 142 of the main storage 111 with the read object. The module switching processing section 160 is activated by a module exchange command input from the terminal 114 or a module exchange message received from the network device 115. In the description of the present embodiment, it is assumed that after the module switching processing section 160 is activated from either of the terminal 114 and the network device 115, the module switching processing section 160 correctly completes the mapping of the new module 143. In addition, it is assumed that at the same time as the mapping, the new module 143 is correctly recorded because an entry table 230 on which module entry addresses are recorded is incorporated in an internal buffer of the module switching processing section 160. The inheritance buffer 147 is used as a buffer which inherits data from the old module 142 to the new module 143. The contents of the data depend on the kind of module, and the structure of the inheritance buffer 147 is not definite.

The old module 142 has the routine 170, an inheritance buffer creating routine 180 and internal data 190. The routine 170 includes several kinds of functions having different uses. The old module 142 will be described later in detail with reference to FIG. 4. The internal data 190 includes the internal global variables of the old module 142, dynamically allocated memory and the like. The inheritance buffer creating routine 180 is a program which creates data to be inherited to the new module 143, on the basis of the internal data 190. The created data is recorded on the inheritance buffer 147.

The new module 143 has the routine 200, an inheritance buffer reflecting routine 210 and internal data 220. As described previously, the new module 143 is mapped in advance by the module switching processing section 160. The routine 200 and the internal data 220 are bug-fixed or version-up programs of the routine 170 and the internal data 190, respectively. The inheritance buffer reflecting routine 210 is a program which refers to the inheritance buffer 147 and reflects the obtained data on the internal data 220. Incidentally, although each of the modules 142 and 143 actually has both the inheritance buffer creating routine 180 and the inheritance buffer reflecting routine 210, FIG. 1 shows the case in which each of the modules 142 and 143 has either one of the routines 180 and 210, by way of example.

Figure 4:
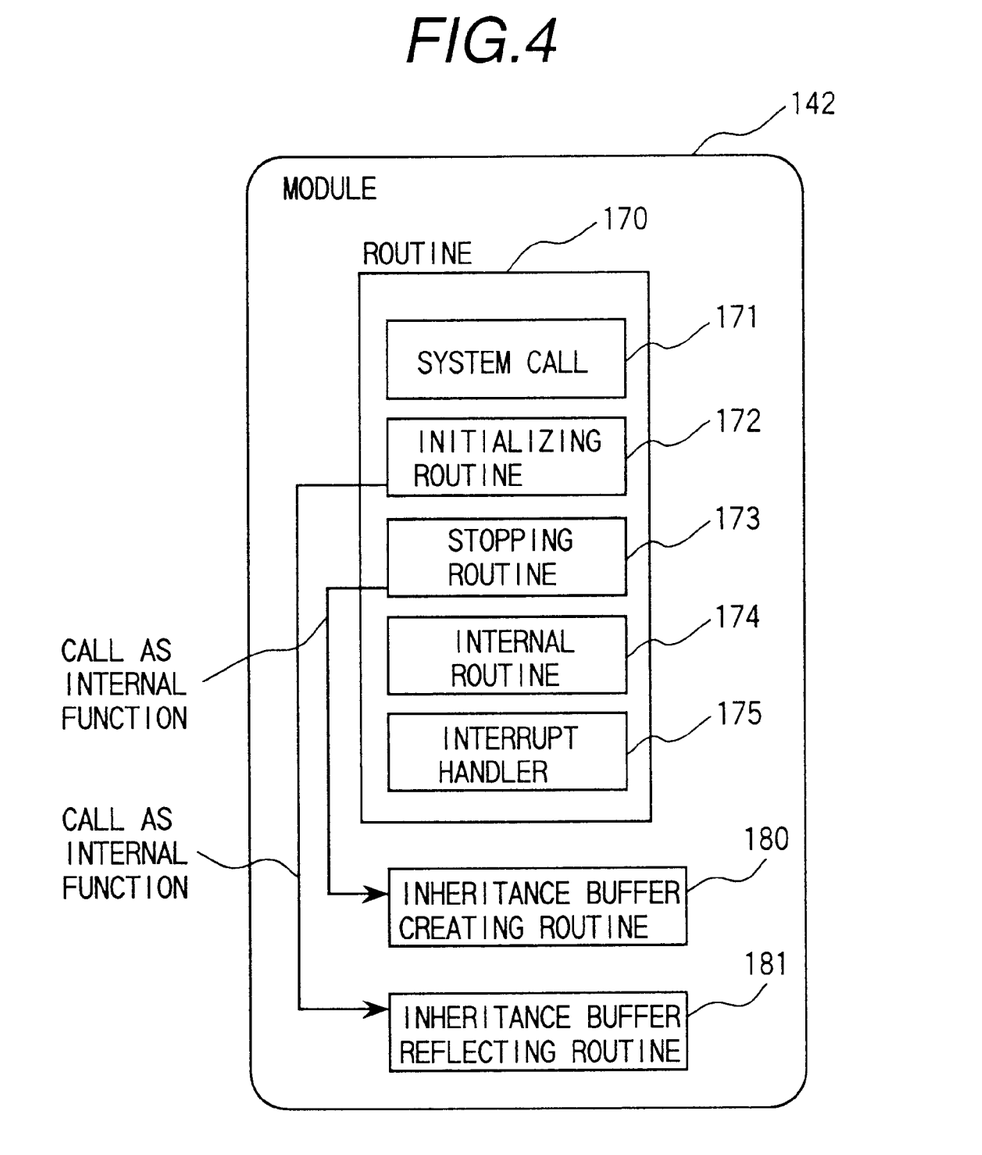
FIG. 4 is a view of the construction of a module.
Figure 9:
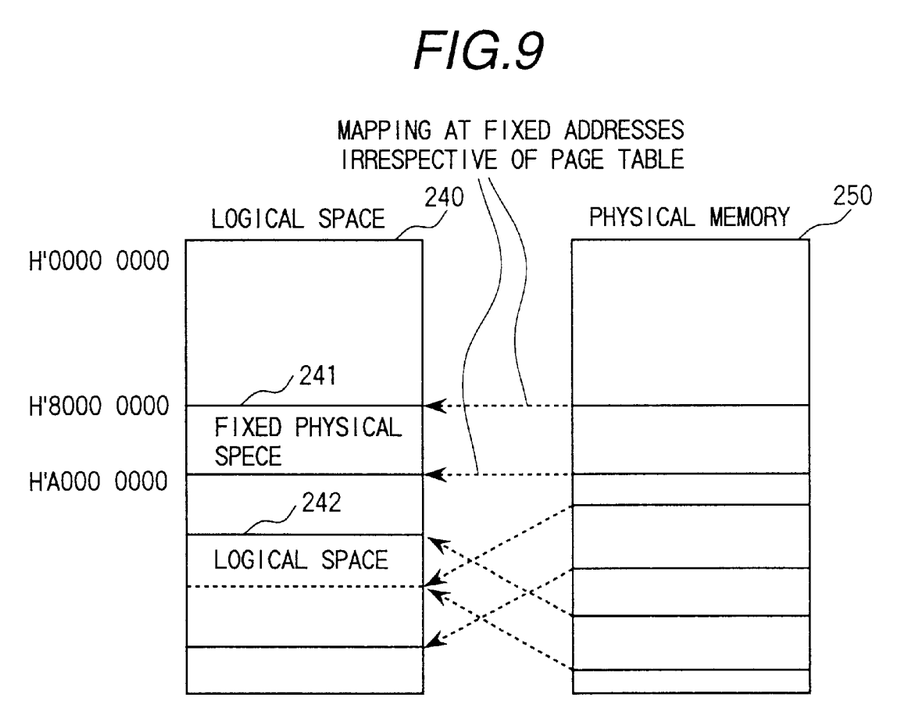
FIG. 9 is a view showing a fixed physical space.

FIG. 9 shows an explanatory view of a fixed physical space 241. The fixed physical space 241 is a space whose logical and physical addresses are equal so that the space can be accessed without the need to refer to the TLB. As compared with a normal logical space 242, the fixed physical space 241 is characterized in that, in the fixed physical space 241, a program can operate irrespective of the operation of a memory management module or the TLB. For this reason, the framework 140 and the inheritance buffer 147 are arranged in the fixed physical space 241. In this arrangement, even if the old module 142 is exchanged for the new module 143, the inheritance buffer 147 can be referred to from the new module 143. However, as compared with the normal logical space 242, the fixed physical space 241 has the problem that external fragmentation easily occurs and the memory capacity of the OS 130 becomes large. For this reason, all normal modules and tasks are mapped in the normal logical space 242. Exceptionally, the page table 145, although it is held by a module, is arranged in the fixed physical space 241. This is because the page table 145 needs to be accessed without performing address conversion FIG. 4 shows the details of the routine 170 of the old module 142. The routine 170 has a system call 171, an initializing routine 172, a stopping routine 173, an internal routine 174 and an interrupt handler 175. The system call 171 is a program which one-to-one corresponds to a system call of the OS 130. The initializing routine 172 is a program for initializing the new module 143 at the time of module exchange, and performs initialization of the internal data 190 of the old module 142 as well as initialization of associated hardware. The initializing routine 172 reflects the internal data of the old module 142 on the internal data 190 of the old module 142, and when inherited information is set in the inheritance buffer 147, the initializing routine 172 calls an inheritance buffer reflecting routine 181. The stopping routine 173 is a program which performs release of dynamically allocated resources and stoppage of associated hardware at the time of module exchange. When the internal data of the old module 142 must be inherited to the new module 143, the stopping routine 173 calls the inheritance buffer creating routine 180. The interrupt handler 175 is an interrupt processing program The internal routine 174 is a program which differs from any of the above-described programs and is called from another module, for example, the new module 143 or the framework 140.

Figure 5:
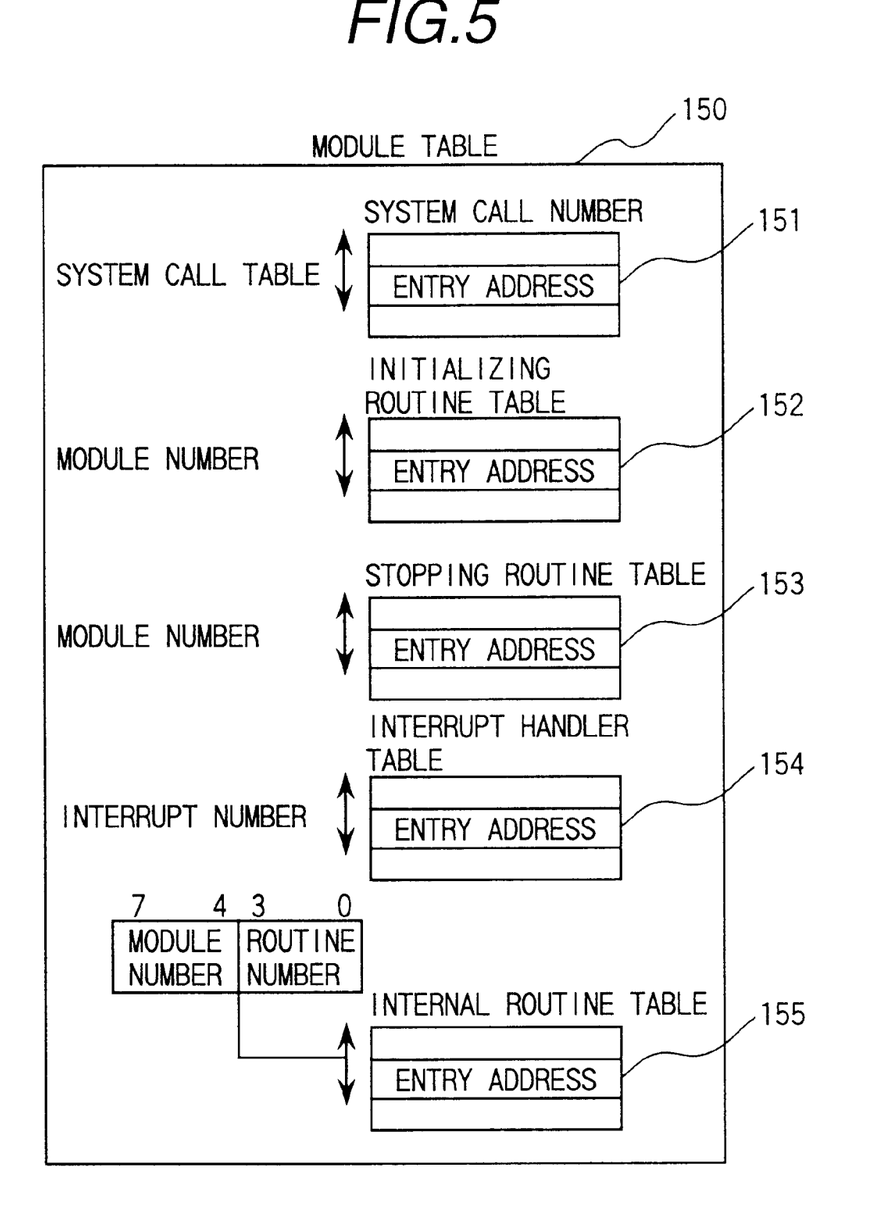
FIG. 5 is a view of the construction of a module table.

FIG. 5 shows the construction of the module table 150. The module table 150 has tables which correspond to the respective routines shown in FIG. 4, and the tables include a system call table 151, an initializing routine table 152, a stopping routing table 153, an interrupt handler table 154 and an internal routine table 155. The entry addresses of the respective routines are stored in the corresponding tables 151 to 155. The number of entries from the leading position of each of the tables 151 to 155 is uniquely determined. In the system call table 151, entry addresses are arranged in the order of system call number. The system call number is uniquely given to each system call. In each of the initializing routine table 152 and the stopping routing table 153, entry addresses are arranged in the order of module number. The module number is uniquely given to each module in the OS 130. In the interrupt handler table 154, entry addresses are arranged in the order of interrupt request number. In the internal routine table 155, entry addresses are arranged in the order of internal routine number. The internal routine number is a module number which includes the upper-order four bits indicative of a module number and the lower-order four bits indicative of a uniquely defined module routine number. A system call procedure using these module tables is described below. First, if a task executes a system call, the framework 140 converts the system call into a system call number and then scans the system call table 151. If an entry address is present in the entry of the system call number, the framework 140 jumps to the corresponding module and performs processing. Calls to the initializing routine 172, the stopping routine 173, the interrupt handler 175 and the internal routine 174 are similarly processed.

Figure 8:
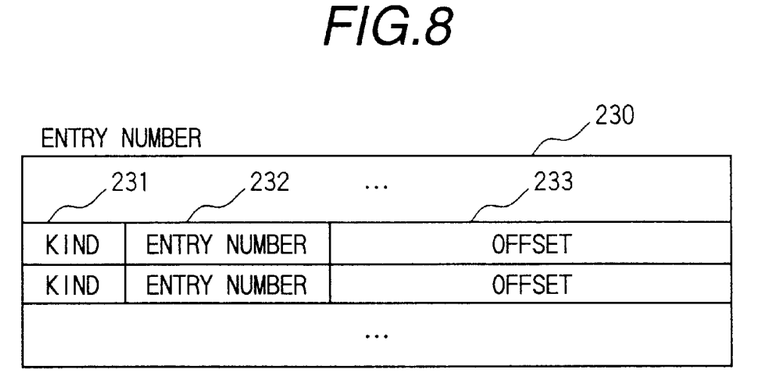
FIG. 8 is a view of the construction of an entry table.

FIG. 8 shows the construction of the entry table 230. As described above, the entry table 230 is previously read by the module switching processing section 160. Each element of the entry table 230 represents entry information for each routine. A kind 231 represents any one of "initializing routine", "stopping routine", "system call", "interrupt routine" and "internal routine". An entry number 232 represents any one of system call number, module number, interrupt request number and routine number. An offset 233 represents the offset from the leading position of a module to the leading position of a routine. If a logical address indicative of a mapped leading position of the module is added to the offset 233, the entry address of the routine is obtained.

Since the present embodiment provides online exchange of modules which perform memory management, a detailed module construction for memory management will be described below.

The old module 142 performs management on the free area of a physical memory, management on the mapping of the physical memory at logical addresses, and exception processing on an exception due to an error of the TLB or the like. To perform such management, the old module 142 has a physical memory management table 191 and a page table 145 in the internal data 190.

Figure 7:
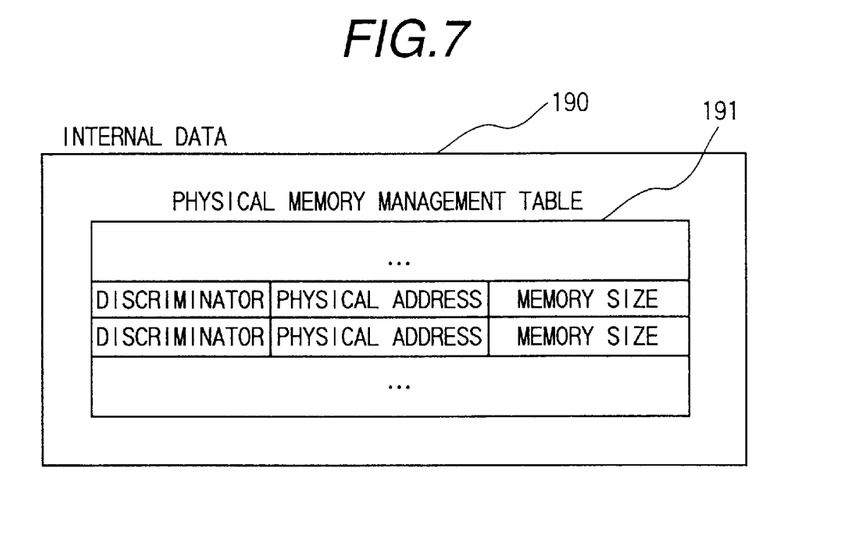
FIG. 7 is a view of the construction of the internal data of the memory management module.

FIG. 7 shows the construction of the internal data 190 of the old module 142. The internal data 190 has the physical memory management table 191 which stores physical addresses indicative of the leading addresses of physical memories which are being used, and memory size discriminators thereof. When a physical memory is to be newly given to another module, a free physical memory is searched for in the physical memory management table 191, and the leading address and the size of the free physical memory are recorded on the physical memory management table 191. The old module 142 always defines the leading address and the size as the function "palmetto". The function "palmetto" can be freely called from another module and the framework 140 via the module table 150 as the internal routine 174. In the above-described manner, the physical memory management table 191 is created by calling the function "palmetto".

Figure 13:
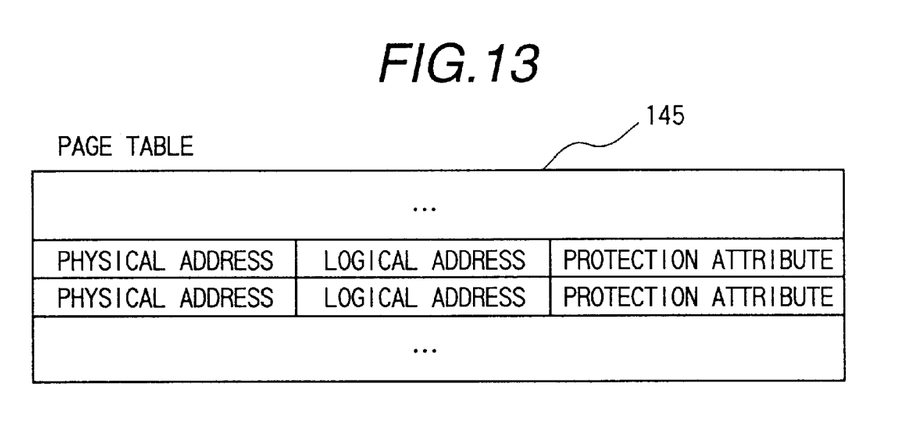
FIG. 13 is a view of the construction of a page table.

FIG. 13 shows the structure of the page table 145. The page table 145 holds the correspondence between physical addresses and logical addresses for each page size, and the protection attribute of the page. At the time of module exchange, if the page table 145 does not hold this information, the OS 130 becomes unable to correctly operate. For this reason, it is necessary to store this information in the inheritance buffer 147.

Figure 6:
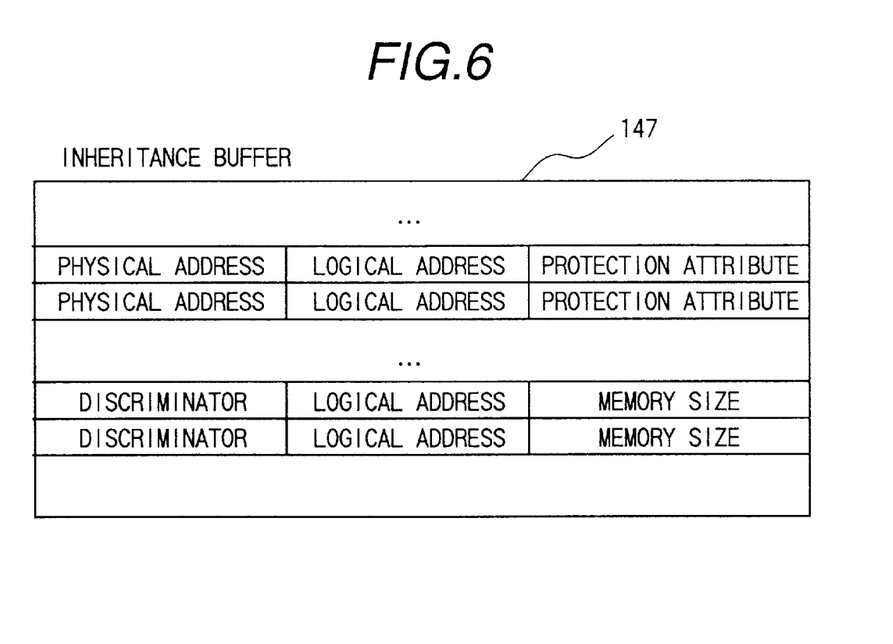
FIG. 6 is a view of the construction of an inheritance of a memory management module.

FIG. 6 shows the construction of the inheritance buffer 147. Logical addresses, physical addresses, protection information, memory size and discriminators are recorded in the inheritance buffer 147. The contents and arrangement of data in the physical memory management table 191 are identical to those of data in the page table 145, but they need not necessarily be identical. However, since the old module 142 and the new module 143 share the inheritance buffer 147, the physical memory management table 191 and the page table 145 need to use a unified data format.

The old module 142 and the new module 143, which are modules which perform memory management, may differ from each other in the type of page table. For this reason, in order to reconstruct the page table 145 from the inheritance buffer 147, each of such modules needs to be provided with the function "p_map". The function "p_map" is a function which maps a specified physical space at specified logical addresses and creates a page table entry. If no physical addresses are specified, the specified physical space is mapped at free logical addresses. The function "p_map" can be freely called from another module and the framework 140 via a module table as an internal routine.

Figure 10:
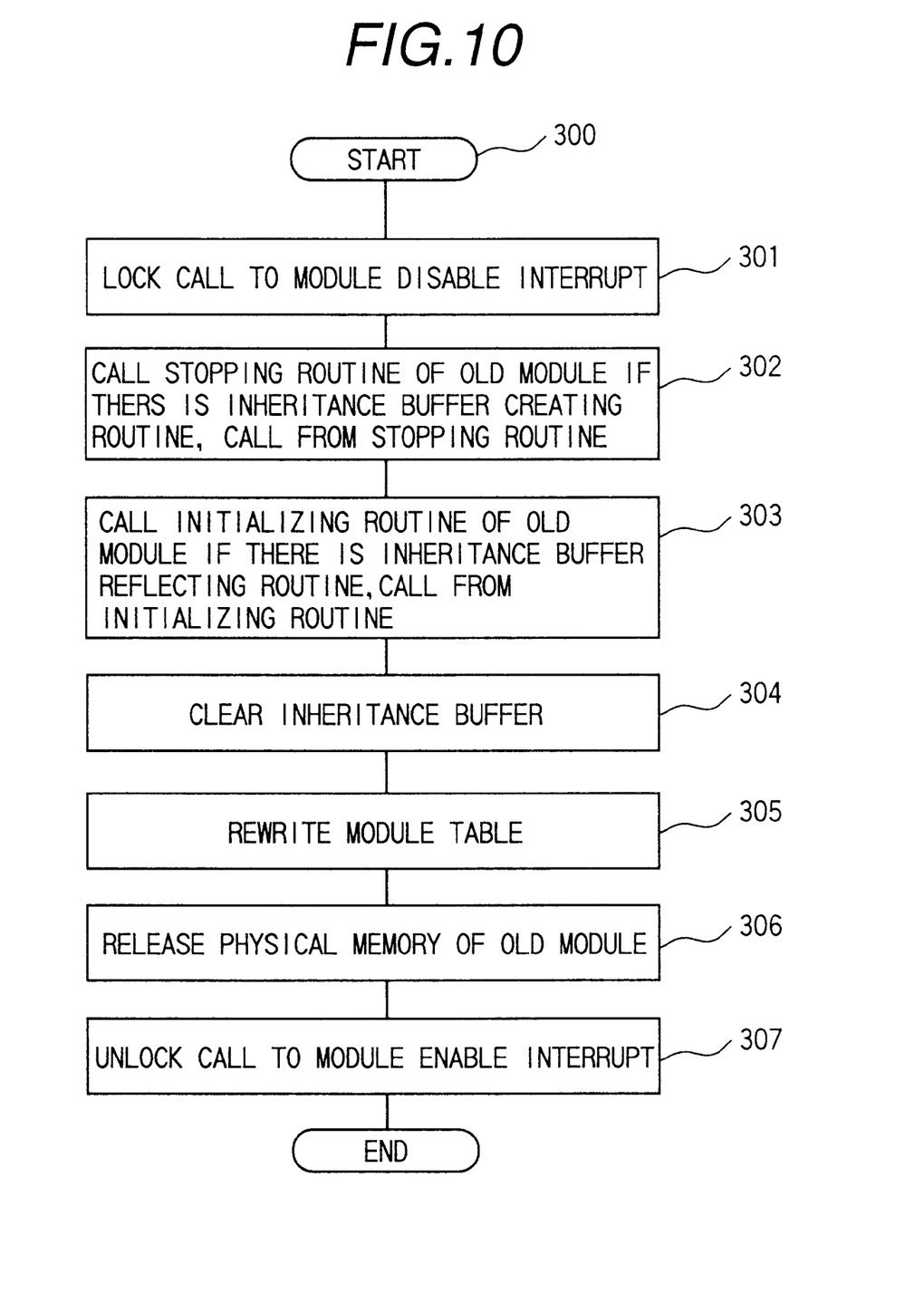
FIG. 10 is a flowchart of a module exchanging processing section.

FIG. 10 shows a procedure for processing online exchange of memory management modules after the module switching processing section 160 is activated.

First, a call to a memory management module is locked (Step 301). This is performed by locking the call to the module in the framework 140. In addition, if there is an interrupt handler, it is necessary to disable an interrupt. The normal CPU 110 has a resistor for disabling an interrupt. The disabling of the interrupt can be executed by setting the resistor.

Then, the stopping routine 173 of the old module 142 is called, and module stopping processing is performed (Step 302). In addition, if the internal data 190 of the old module 142 must be preserved, the inheritance buffer creating routine 180 is called. After that, if there are a dynamically reserved memory area and a currently acquired resource (such as the lock of another module), they are released. In the case of the memory management module, the page table 145 is released.

Then, the initializing routine 172 of the new module 143 is called (Step 303). The initializing routine 172 initializes the internal data 220 of the module. If there is information in the inheritance buffer 147, the inheritance buffer reflecting routine 210 is called. Thus, the contents of the inheritance buffer 147 are reflected on the internal data of the module.

Then, the inheritance buffer 147 is cleared to zero (Step 304).

Then, the contents of the module table 150 are rewritten with the entry addresses of the respective routines of the new module 143 (Step 305). The module switching processing section 160 adds these new entry addresses to each of the offsets 233 of the entry table 230 and the leading address of the logical addresses of the new module 143. Thus, the leading logical addresses of the respective modules are obtained. The obtained addresses are recorded on the corresponding module tables.

Then, the physical memory of the new module 143 is released (Step 306).

Finally, the new module 143 is unlocked (Step 307). In addition, the interrupt disabled state is released. This can be executed by resetting the interrupt resistor of the CPU 110.

Figure 11:
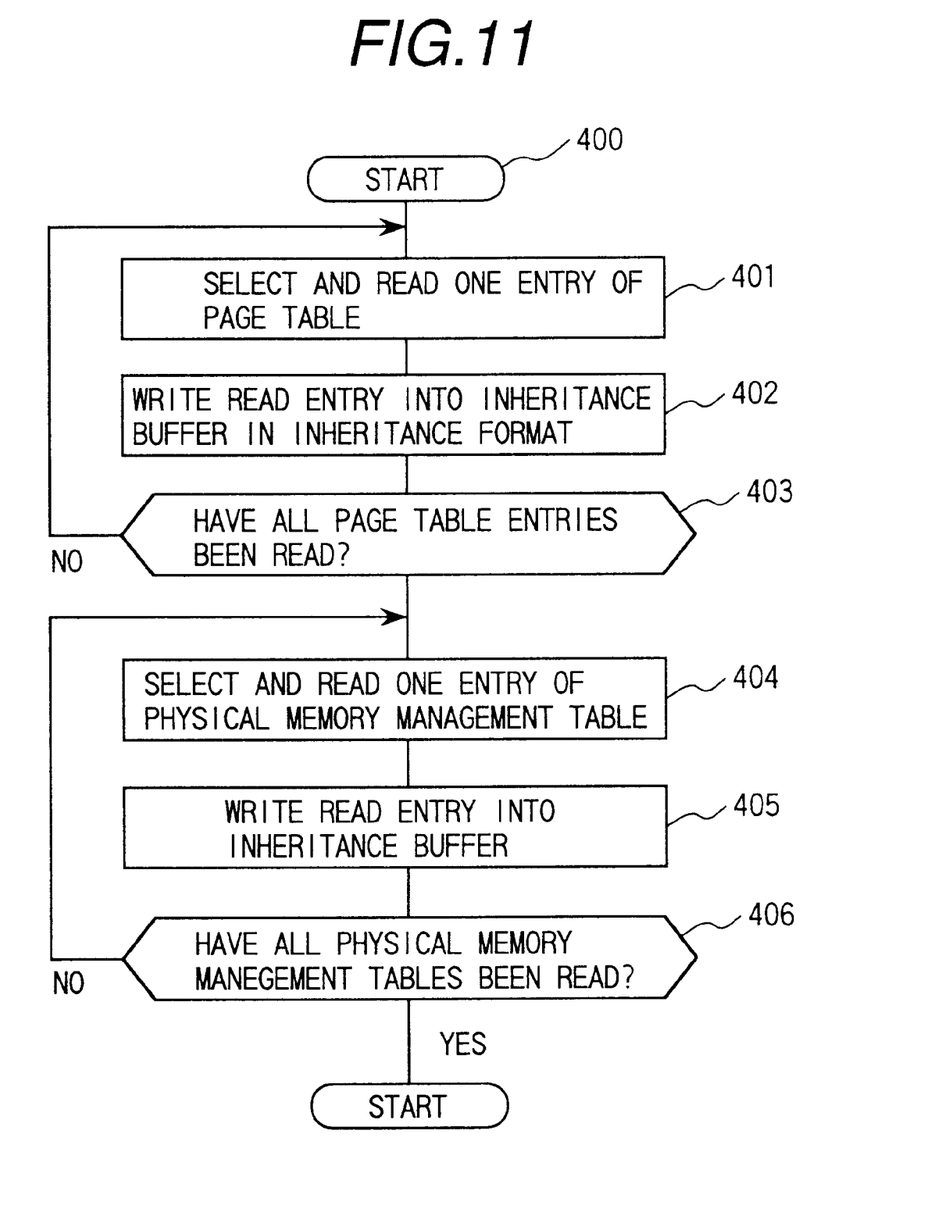
FIG. 11 is a flowchart of an inheritance buffer creating buffer in the memory management module.

FIG. 11 shows a procedure for processing the inheritance buffer creating routine 180 for the memory management module. In the routine 180, the inheritance buffer 147 is created on the basis of the page table 145.

First, one entry of the page table 145 is read (Step 401). The physical address, the logical address and the protection attribute of this entry are obtained.

Then, the physical address, the logical address and the protection attribute are recorded at one entry of the inheritance buffer 147 on the basis of the entry read in Step 401 (Step 402).

The above steps 401 and 402 are performed on all the entries of the page table 145 (Step 403).

Then, one entry of the physical memory management table 191 is read (Step 404). The discriminator, the physical address and the memory size of this entry are obtained.

Then, the discriminator, the logical address and the memory size are recorded at one entry of the inheritance buffer 147 on the basis of the entry read in Step 404 (Step 405).

Then, the above steps 404 and 405 are performed on all the entries of the physical memory management table 191 (Step 406).

Figure 12:
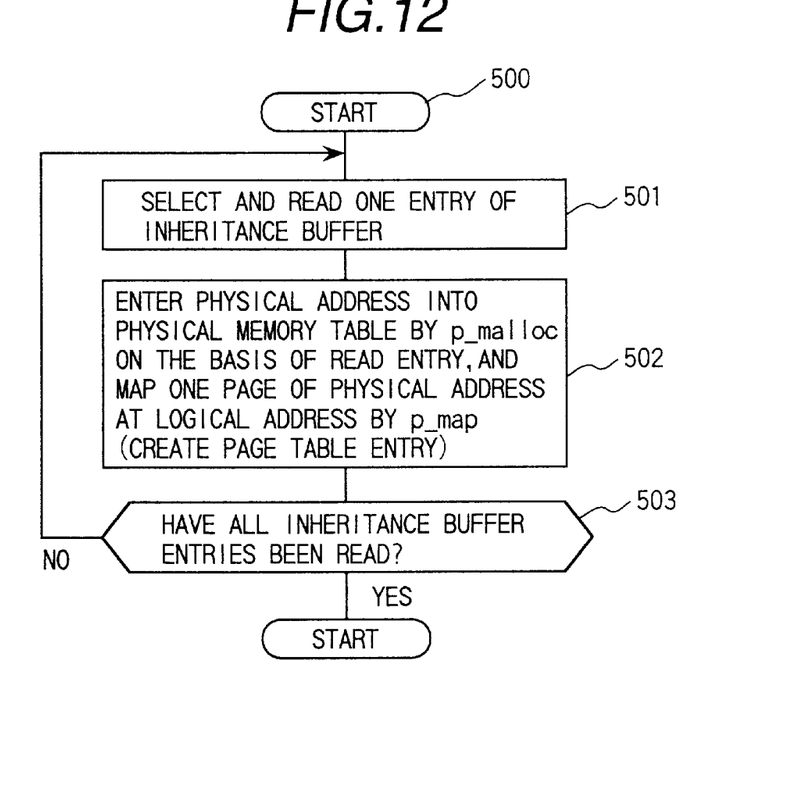
FIG. 12 is a flowchart of an inheritance buffer reflecting buffer in the memory management module.

FIG. 12 is a procedure for processing the inheritance buffer reflecting routine 210 for the memory management module. In this routine 210, the information of the inheritance buffer 147 is reflected on the page table 145. In addition, the physical memory management table 191 of the internal data 190 is created.

First, one entry of the inheritance buffer 147 is read (Step 501). The physical address, the logical address and the protection attribute of the entry are obtained.

Then, if the page of the entry read in Step 501 is a physical memory and a management table, "palmetto" is called to enter the physical address into the physical memory management table 191 (Step 502). Otherwise, if the entry belongs to a page table, "p_map" is called to add a page table entry.

The above steps 501 and 502 are performed on all the entries of the inheritance buffer 147 (Step 503).

According to the present invention, even in the case of exchange of memory management modules, the contents of a page table or a physical memory table can be inherited from an old module to a new module. Mapping information on modules, tasks and a framework is not lost. Therefore, it is possible to exchange the memory management modules without restarting the system.

What is claimed is:

1. A method of exchanging modules in an operating system which includes:
   a plurality of modules,
   a framework,
   an inheritance buffer,
   a fixed physical space whose logical space and physical space are equal to each other, and
   a virtual space whose logical space and physical space do not coincide with each other, said inheritance buffer present in said virtual space, comprising:
      stopping a call to an old module before a module exchange is stopped,
      storing inherited information in said inheritance buffer with said old module,
      exchanging modules, and
      after said module exchange, reading the inherited information from said inheritance buffer with a new module.

2. A method of exchanging modules according to claim 1, wherein said operating system has a page table which manages a correspondence between logical addresses and physical addresses for each module and a memory management table which manages said page table, comprising storing the correspondence between the logical addresses and the physical addresses in said inheritance buffer from said page table of an old memory management module before an exchange, and after the exchange reading the correspondence between the logical addresses and the physical addresses from said inheritance buffer and creating a page table of a new memory management module with said new memory management module.

3. A method of exchanging modules according to claim 2, wherein said memory management module is a module which has a physical memory management table on which are recorded a use state indicating whether a physical memory is being used or not being used and a discriminator of the physical memory, said memory management module allocating the physical memory and, at the time of releasing the physical memory, recording the use state and the discriminator of a certain physical address on said memory management module, comprising:
   storing the use state and the discriminator in said inheritance buffer from said physical memory management table of an old memory management module before an exchange, and after the exchange reading the use state and the discriminator from said inheritance buffer and creating a physical memory management table of said new memory management module with said new memory management module.

* * * * *